Figure 1:
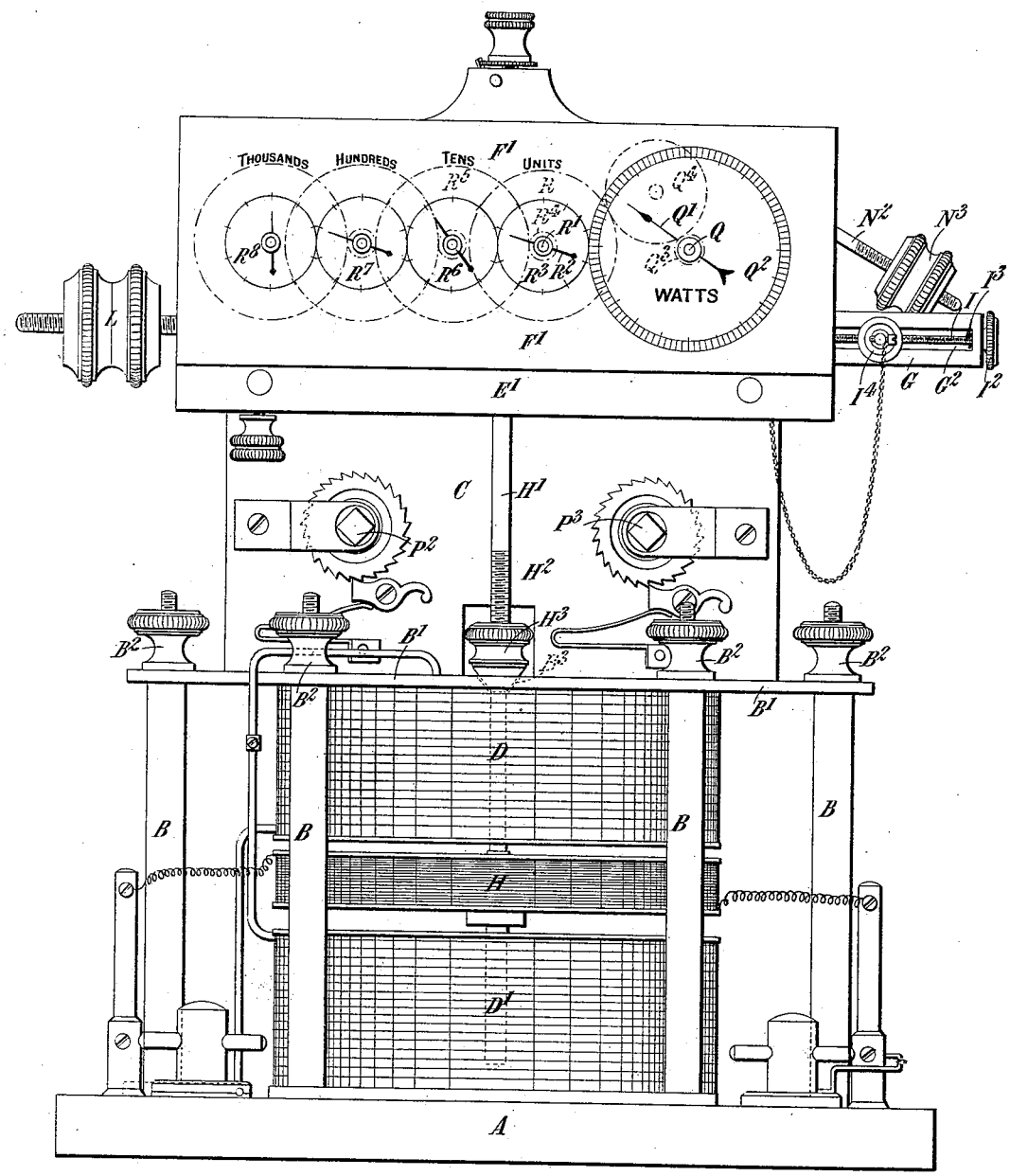

(No Model.)　　　　　　　　　　　　　　　　　　　　　4 Sheets—Sheet 1.
J. A. DÉJARDIN.
ELECTRIC METER.

No. 546,917.　　　　　　　　　　　　　Patented Sept. 24, 1895.

Witnesses:

Inventor,
Jules Adrien Déjardin,
By James L. Norris.
Atty.

(No Model.) 4 Sheets—Sheet 2.

J. A. DÉJARDIN.
ELECTRIC METER.

No. 546,917. Patented Sept. 24, 1895.

Witnesses:

Inventor
Jules Adrien Déjardin
By James L. Norris.
Atty.

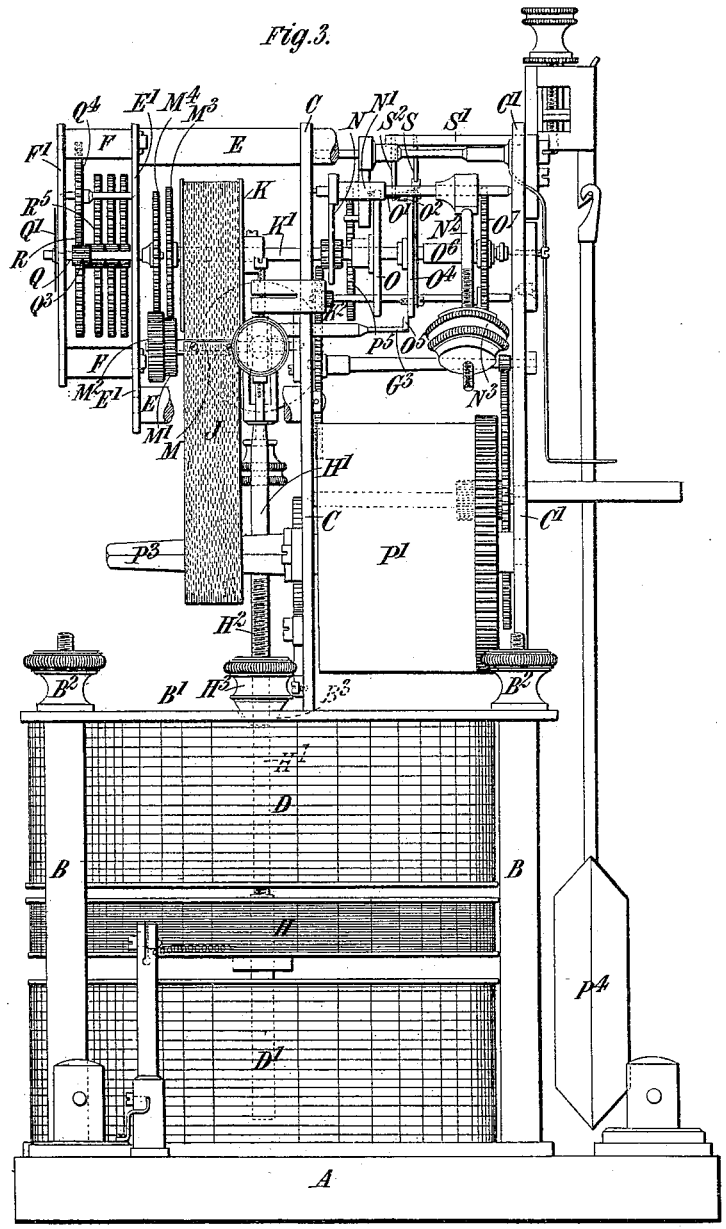

(No Model.) 4 Sheets—Sheet 4.
J. A. DÉJARDIN.
ELECTRIC METER.
No. 546,917. Patented Sept. 24, 1895.
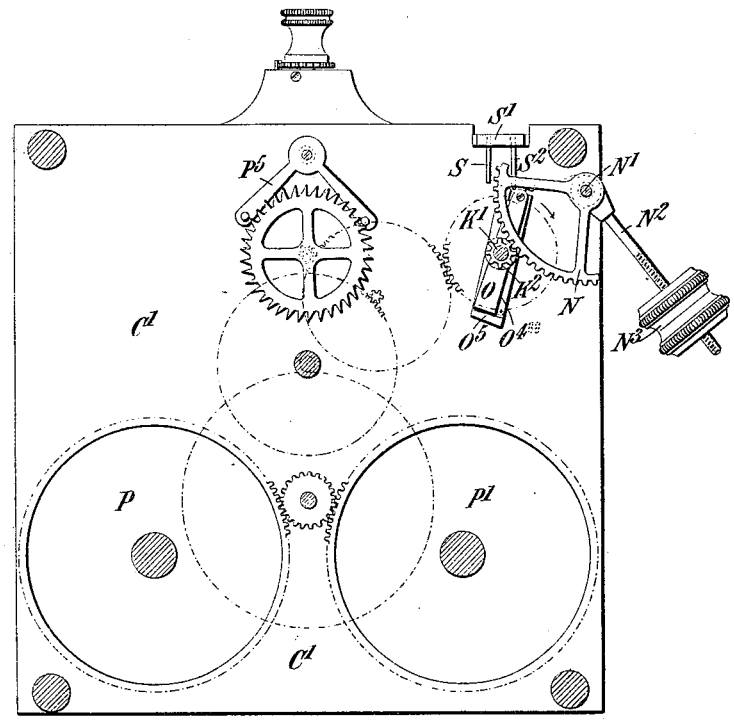
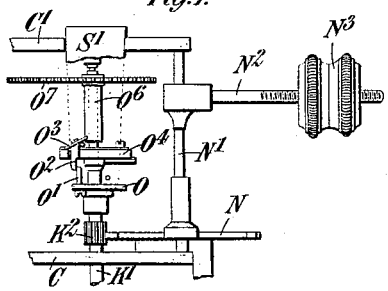
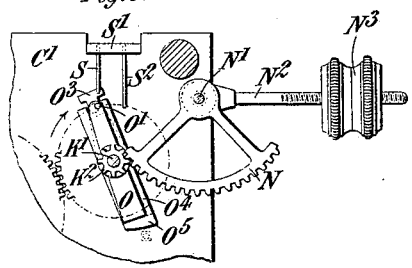
Witnesses:
Inventor,
Jules Adrien Déjardin
By James L. Norris.
Atty.

United States Patent Office.

JULES ADRIEN DÉJARDIN, OF PARIS, FRANCE.

ELECTRIC METER.

SPECIFICATION forming part of Letters Patent No. 546,917, dated September 24, 1895.

Application filed April 20, 1895. Serial No. 546,539. (No model.) Patented in France April 8, 1892, No. 220,769; in Belgium October 8, 1892, No. 101,674, and in England October 10, 1892, No. 18,066.

*To all whom it may concern:*

Be it known that I, JULES ADRIEN DÉJARDIN, watchmaker, a citizen of the Republic of France, residing at 57 Boulevard Richard Lenoir, Paris, in the Republic of France, have invented certain new and useful Improvements in Electric Meters, (for which I have obtained patents in Great Britain, No. 18,066, dated October 10, 1892; in France, No. 220,769, dated April 8, 1892, and in Belgium, No. 101,674, dated October 8, 1892,) of which the following is a specification, reference being had to the accompanying drawings.

My invention relates to electric meters.

The object of my said invention is to construct a meter which will at any time indicate on a scale the amount of energy which has been supplied to the circuit since the meter was attached.

My improved meter, in short, indicates "watt-hours."

The main principle of my invention is as follows—that is to say: I provide a pivoted balance-beam from which is suspended a coil, which coil is acted upon by a fixed coil or coils. The supply-current or a part thereof passes through both the fixed and suspended coils. The upward or downward pressure of the suspended coil then tilts the beam. I provide, also, a weight which is continuously and regularly increased, which weight acts on the beam in the opposite sense to that of the suspended coil. The increase in the weight which is required to balance the pull or push of the suspended coil is proportional to the product of the currents flowing in the fixed and suspended coils. I make the suspended coil of fine wire and join it as a shunt to the circuit to which the meter is attached, the fixed coil or coils being of thick wire and joined in series with the said circuit, so that the product of the currents in the coils is proportional to the watts supplied. The increase in the weight is therefore proportional to the watts. Also, since the increase of weight is regular, the time during which the weight is increased is proportional to the watts. I so arrange the indicating mechanism that during successive equal intervals of time the said mechanism is operated only as long as the beam is not balanced—that is to say, until the effective weight on the beam has been increased by such an amount as to balance the effect of the suspended coil on the beam. The period of time during which the mechanism is operated is proportional to the watts. The mechanism therefore integrates the watts. If the pull or push of the suspended coil on the beam is so great that the increase of weight during the whole of the period only just balances the beam, the mechanism is operated during the whole interval and any increase in the number of watts does not affect the mechanism. I arrange, as aforesaid, that the balance-weight on the beam shall be continuously increased during the whole interval; but as soon as the beam is balanced—that is to say, as soon as enough weight has been added—the indicating mechanism is put out of gear. At the end of an interval the whole of the increase in weight is taken off the beam and is again continuously and regularly applied thereto during the next interval. These operations are effected by a clockwork mechanism. The weight I prefer to use is a chain, one end of which is secured to the beam, the other end being secured to a drum, off which it unwinds, so as to continuously and regularly increase the weight on the beam, and on which it is wound at the end of every interval, so as to relieve the beam of the increased weight.

Figure 2:
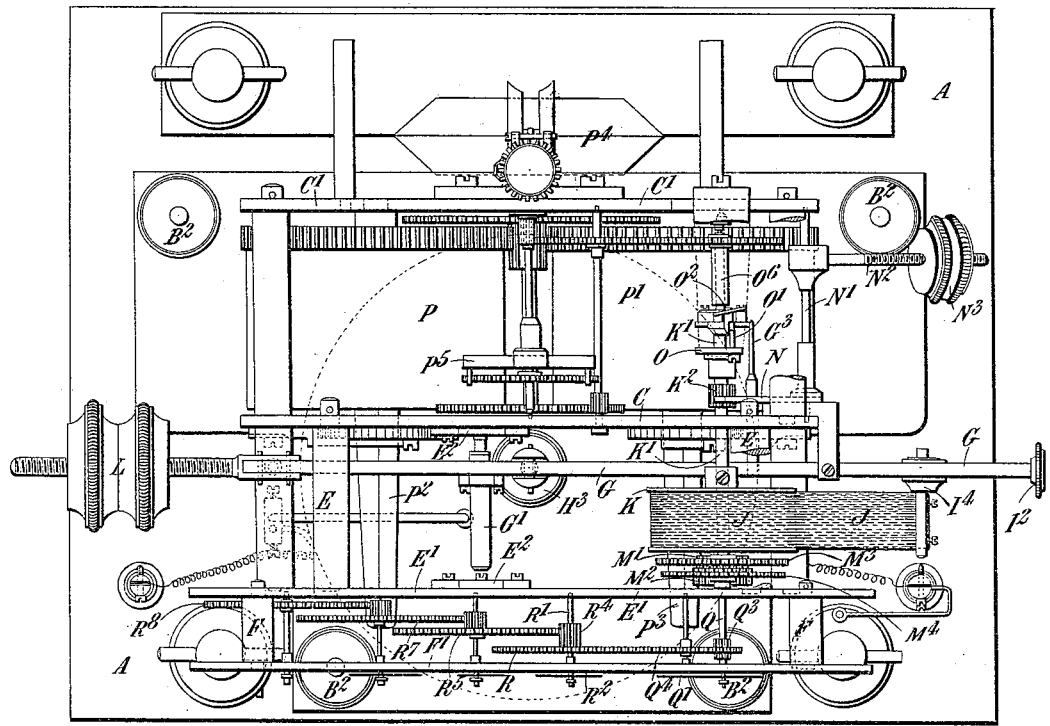
Figure 4:
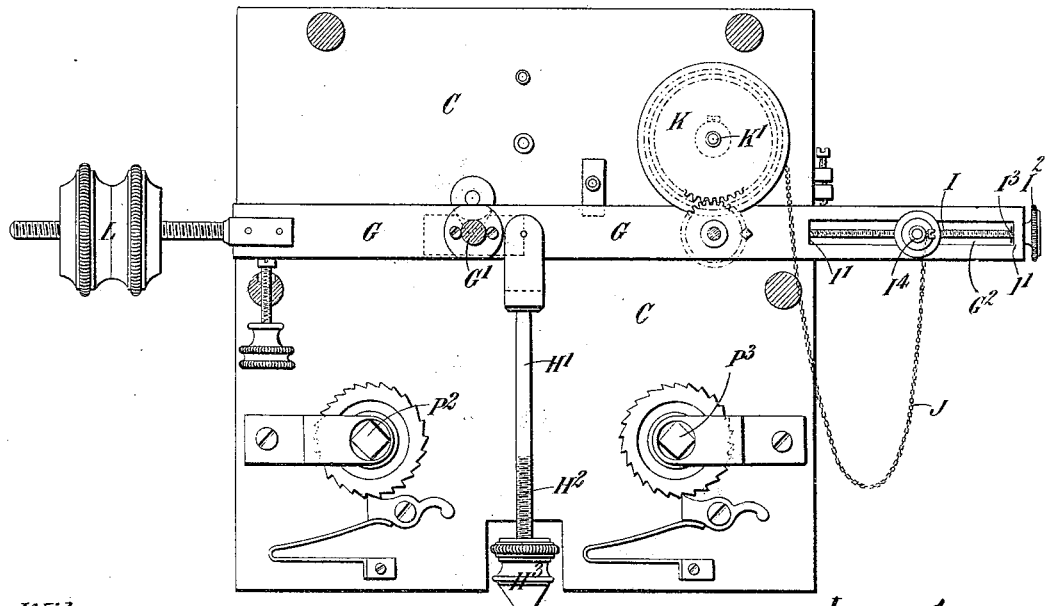

In the accompanying drawings, Figure 1 is a front view of one form of meter constructed according to this invention, the outer case being removed. Fig. 2 is a plan, and Fig. 3 is a side view, of the same. Fig. 4 is a front view showing the beam with its appurtenances. Fig. 5 is a front elevation of the device for winding and unwinding the chain, and showing, also, other parts of the apparatus, the front plate of the frame being removed. Fig. 6 is another elevation showing the parts of the said winding device in another position. Fig. 7 is a plan of the same.

A is the base, to which are secured pillars B B, supporting the frame-plates C C'.

D D' are the two fixed coils, wound with thick wire and firmly secured between the base A and the plate B', which is secured to the tops of the pillars B B by the nuts B² B².

E E are rods secured to the front plate C of the frame, to the ends of which rods is secured a plate E'. From the plate E', in a similar manner, the rods F F project and support the dial-plate F'.

G is the beam, which is mounted on a shaft G', supported between the plates C E' in bearings $E^2 E^2$.

H is the moving coil, wound with fine wire and supported by a rod H' from the beam G at a point near the shaft G'. The rod H' is screw-threaded, as shown at $H^2$, and is provided with a milled nut $H^3$, and when the nut is screwed down the said rod takes a bearing in a hole $B^3$ in the plate B' and can be caused to lift up the coil H and hold it firmly against the bottom of the upper fixed coil D when the instrument is required to be carried about.

I is a screw adapted to be rotated in bearing I' I' in the beam G by means of a milled head $I^2$. Said rod is prevented from moving endwise in its bearings by the pin $I^3$ and the milled head $I^2$, aforementioned. $I^4$ is a nut mounted on the rod I, which nut is moved along the slot $G^2$ when the screw I is turned. To the nut $I^4$ is secured one end of a chain J, the other end of which is secured to a drum K, hereinafter described.

L is an adjustable counter weight screwed on the end of the beam G opposite to the nut $I^4$, for the purpose of balancing the weight of the moving coil H and the part of the chain J which is always pressing on the beam. The beam has secured to it a shaft or rod M, on which are loosely mounted two pinions M' $M^2$, secured together and turning with each other. The drum K is secured on a spindle K', supported in bearings in the plates C C'. On the end of the spindle is secured a gear-wheel $M^3$, which engages with the pinion M' when the beam G is raised, but is disengaged from said pinion when the beam is depressed.

$K^2$ is a pinion secured on the spindle K' and engaged with a toothed sector N, which is secured to a shaft N', supported in bearings in the plates C C'. The said shaft N' carries an arm $N^2$, on which is secured a suitable weight $N^3$.

O is a radial arm mounted on the spindle K' and furnished with a projecting pin O', which can engage with a pin $O^2$, carried on a spring $O^3$, which is secured to an arm $O^4$. The arm $O^4$ is mounted on a sleeve $O^6$, surrounding the spindle K', on which sleeve is also secured a gear-wheel $O^7$, which forms the last wheel of the clock. The arm $O^4$ also carries a wedge-shaped piece $O^5$, for a purpose hereinafter explained. The clock is driven by two springs contained in boxes P P' and having winding-squares $P^2 P^3$. A suitable pendulum $P^4$ and escapement $P^5$ control the rate of the clock. The pendulum may be replaced by any suitable synchronizing device, such as a spring or the like. The indicating and integrating train is contained between and supported by the plates E' F'.

Q is a spindle having secured to it a gear-wheel $M^4$, which engages with the pinion $M^2$ when the beam G is tilted. The spindle Q carries a pointer Q', which marks watts on the dial $Q^2$, and is also provided with a pinion $Q^3$, which gears with an intermediate wheel $Q^4$, which is in gear with a wheel R, mounted on a spindle R'. The spindle R' carries a pointer $R^2$, which indicates units on the dial $R^3$. In the particular instrument illustrated each unit means a hundred watt-hours. The spindle R' is also provided with a pinion $R^4$, which gears with a wheel $R^5$, secured on a spindle carrying a pointer which marks tens on the dial $R^6$. It will be readily understood from the drawings that the dials $R^7$ and $R^8$ mark hundreds and thousands, respectively, this particular instrument registering up to one million watt-hours.

The operation of the instrument will now be described. The clock is driven continuously by its springs, and through the wheel $O^7$ and sleeve $O^6$ rotates the arm $O^4$ in the direction of the arrow in Fig. 5. The rate of the clock is arranged so that the sleeve $O^6$ makes one revolution in any desired period of time—five minutes, for example. The pin $O^2$, by means of the pin O' and arm O, drives the spindle K' and the drum K, off which the chain J unwinds. The length of chain which is unwound in one interval is equal to the circumference of the drum K. As the spindle K' rotates, the pinion $K^2$, through the sector N, turns the shaft N' and raises the weight $N^3$. At the beginning of an interval the position of the parts is as shown in Fig. 5, the chain J being wound up to its greatest amount on the drum K and the weight $N^3$ being in its lowest position. Just before the end of an interval the position of the parts is as shown in Fig. 6. The chain is almost entirely unwound and the weight $N^3$ is raised to nearly its highest position. At the end of the interval the spring $O^3$ comes in contact with a pin S, secured to a plate S', carried by the plate C', and is pushed aside, thereby releasing the pin O'. The weight $N^3$, through the sector N and pinion $K^2$, turns the spindle K' and drum K backward and winds up the chain on the drum. The shaft K' cannot, however, turn backward for more than one revolution, as the pin O' on the arm O strikes against a second pin $S^2$ on the plate S'. This second pin is placed a little to the right of the pin S, so that the drum does not rotate a whole revolution, and the engagement of the pin O' with the spring-pin $O^2$ is insured. Referring now to Fig. 3, the coils D D' H are so wound that as long as a current is passing through the said coils the suspended coil H is pressed upward. This tilts the beam G and causes the pinions M' $M^2$ to engage with the wheels $M^3$ $M^4$. Therefore, as long as the upward pressure of the coil H is unbalanced the indicating-pointer Q' is rotated by the spindle K. As soon as sufficient chain has been unwound from the drum K to balance the upward pressure of the coil H the beam G is brought to a level position and the pinions M' $M^2$ put out of gear with the wheels M³ M⁴, so that during the remaining portion of the interval the apparatus does not register. If the number of watts supplied is so considerable that the entire length of chain is required to balance the pressure of the coil H, the apparatus registers during the whole interval, and at the end of said interval, if the beam G is still not balanced, the wedge-shaped projection O⁵ on the arm O⁴ engages with the end of a rod G³, secured to the beam G, and presses down said beam. If this were not done, the indicating apparatus would be rotated backward when the weight N³ wound up the chain on the drum. It will be understood that the dials are actuated in succession by the integrating gearing from the spindle Q.

To illustrate the capacity of the meter, I will assume that the interval of time required to unwind the chain is five minutes. Then if the coil H is pressed up with such force that the entire weight of the chain is required to balance the pressure the apparatus registers during the whole interval and the indicator shows that one unit of energy has been expended in the circuit—that is to say, one hundred watt-hours have been used in five minutes—that is, twelve hundred watt-hours per hour—or the circuit is using power at the rate of twelve hundred watts. If it be now assumed that one-quarter only of the chain is required to be unwound to balance the upward pressure on the coil H, then the registering-pointer Q' is only moved to the mark "25" in the five minutes—that is to say, during the first quarter of this time it is moved to the mark "25"—and then the beam G is balanced by the chain and the pointer-shaft Q put out of gear with spindle K', so that during the remaining three-quarters of the interval the pointer does not move. The apparatus therefore registers twenty-five watt-hours in five minutes, and the circuit is using power at the rate of three hundred watts. The number of watts supplied can therefore be obtained by multiplying the indication on the dial Q² by twelve. It can readily be shown by similar reasoning that if the interval of time were fixed at three minutes the power would be obtained by multiplying the reading on the dial Q² by twenty instead of by twelve.

The calibration or absolute reading of the apparatus is obtained by suitably proportioning the number of turns in the fixed and moving coils and the weight of the chain per inch. These quantities may of course be altered to suit the circumstances under which the meter is designed to be used. Any slight variation may be allowed for and the meter adjusted by turning the milled head I² and so moving the point of attachment of the chain to the beam and then balancing the beam by adjusting the counterweight L.

What I claim is—

1. In an electric meter, the combination of fixed and movable coils through which currents are passed, a pivoted balance beam from which the movable coil is suspended, a chain suspended from one end of said balance beam and at its other end resting upon a support, and means for continuously increasing the length of the chain suspended from the balance beam throughout equal intervals of time, and for shortening said chain at the end of each said intervals, substantially as and for the purpose specified.

2. The combination of fixed and movable coils through which currents are passed, a pivoted balance beam from which the movable coil is suspended and which is tilted by the said movable coil, a chain suspended from one end of said balance beam and at its other end resting upon a support, means for continuously increasing the length of the chain suspended from the balance beam throughout equal intervals of time and for shortening said chain at the end of each said intervals, integrating and indicating devices operated by a motor, and means for disconnecting the indicating and integrating devices from the motor as soon as the increase in the length of chain on the beam balances the tilting movement of the movable coil, substantially as and for the purpose specified.

3. The combination of fixed and movable coils through which currents are passed, a pivoted balance beam from which the movable coil is suspended, a chain one end of which is secured to the beam the other end thereof being secured to and supported by a rotary drum, and means for continuously unwinding the chain from the drum throughout equal intervals of time and winding the said chain on the drum at the end of each said intervals, substantially as, and for the purpose, specified.

4. The combination of fixed and movable coils through which currents are passed, a pivoted balance beam from which the movable coil is suspended, a chain one end of which is adjustably secured to the beam the other end thereof being secured to and supported by a rotary drum, and means for continuously unwinding the chain from the drum throughout equal intervals of time and winding the said chain on the drum at the end of each said intervals, substantially as, and for the purpose, specified.

5. The combination of fixed and movable coils through which currents are passed, a pivoted balance beam from which the movable coil is suspended and which is tilted by the action of said movable coil, a chain one end of which is secured to the beam the other end thereof being secured to and supported by a drum, a rotatable shaft on which said drum is secured, an arm secured to said shaft and adapted to be engaged by a driving arm secured to the last wheel of a clock, means for putting the two said arms out of engagement at the end of each revolution of the said wheel, and means connected with the drum shaft whereby said shaft is rotated backward as soon as the arm thereon is disengaged from the driving arm, substantially as, and for the purpose, specified.

6. The combination of fixed and movable coils through which currents are passed, a pivoted balance beam from which the movable coil is suspended and which is tilted by the action of said movable coil, a chain one end of which is secured to the beam the other being secured to and supported by a drum, a rotatable shaft on which said drum is secured, an arm secured to said shaft and adapted to be engaged by a driving arm secured to the last wheel of a clock, indicating and integrating devices, and means carried by the beam whereby the drum shaft is connected with the first shaft of the indicating devices as long as the beam is tilted but is disconnected when and as long as the beam is level, substantially as, and for the purpose, specified.

7. The combination of fixed and movable coils through which currents are passed, a pivoted balance beam from which the movable coil is suspended and which is tilted by the action of said movable coil, a chain one end of which is secured to the beam the other being secured and supported by a drum, a rotatable shaft on which said drum is secured, an arm secured to said shaft and adapted to be engaged by a driving arm secured to the last wheel of a clock, means for putting the two said arms out of engagement at the end of each revolution of the said wheel, indicating and integrating devices, and means carried by the beam whereby the drum shaft is connected with the first shaft of the indicating devices as long as the beam is tilted but is disconnected when and as long as said beam is level, substantially as, and for the purpose, specified.

In witness whereof I have hereunto set my hand this 2d day of November, 1894.

JULES ADRIEN DÉJARDIN.

Witnesses:
  VATTE,
  H. BÈGUIS.